United States Patent
Kimura (10) Patent No.: US 10,824,289 B2
(45) Date of Patent: Nov. 3, 2020

(54) ELECTRONIC DEVICE (71) Applicant: SHARP KABUSHIKI KAISHA, Sakai (JP)

(72) Inventor: Tomohiro Kimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/495,656

(22) PCT Filed: Mar. 16, 2018

(86) PCT No.: PCT/JP2018/010623
§ 371 (c)(1),
(2) Date: Sep. 19, 2019

(87) PCT Pub. No.: WO2018/173976
PCT Pub. Date: Sep. 27, 2018

(65) Prior Publication Data
US 2020/0019262 A1 Jan. 16, 2020

(30) Foreign Application Priority Data

Mar. 23, 2017 (JP) ................. 2017-057541

(51) Int. Cl.
G06F 3/044 (2006.01)
G06F 1/16 (2006.01)
G06F 3/041 (2006.01)
G06F 3/0362 (2013.01)

(52) U.S. Cl.
CPC ............ *G06F 3/044* (2013.01); *G06F 1/1601* (2013.01); *G06F 3/0362* (2013.01); *G06F 3/0416* (2013.01)

(58) Field of Classification Search
CPC .. G06F 1/1601; G06F 3/03547; G06F 3/0362; G06F 3/0416; G06F 3/044
See application file for complete search history.

(56) References Cited

U.S. PATENT DOCUMENTS

| | | |
|---|---|---|
| 2014/0139637 A1 | 5/2014 | Mistry et al. |
| 2015/0109744 A1 | 4/2015 | Jufer et al. |
| 2016/0091867 A1* | 3/2016 | Mansour ................ G04G 21/08 368/294 |
| 2017/0329511 A1 | 11/2017 | Ueno et al. |
| 2020/0089327 A1* | 3/2020 | Kimura .................. G06F 1/163 |

FOREIGN PATENT DOCUMENTS

| | | |
|---|---|---|
| JP | 2015-078984 A | 4/2015 |
| JP | 2016-115208 A | 6/2016 |

* cited by examiner

*Primary Examiner* — Dmitriy Bolotin
(74) *Attorney, Agent, or Firm* — ScienBiziP, P.C.

(57) ABSTRACT

Signals based on touch operation can be easily separated from a signal output by a touch panel. A peripheral edge of a touch panel and a touch surface is surrounded by a dial part. The dial part is located at a position higher than a position of the touch surface.

6 Claims, 7 Drawing Sheets

ELECTRONIC DEVICE

TECHNICAL FIELD

The disclosure relates to an electronic device, and particularly to an electronic device including a touch panel and a dial.

BACKGROUND ART

A touch device (electronic device) including a touch panel and a dial is currently being developed. As an example, PTL 1 describes what is called a wearable, wristwatch-type device, which includes a dial disposed around a circular touch panel.

Figure 6:
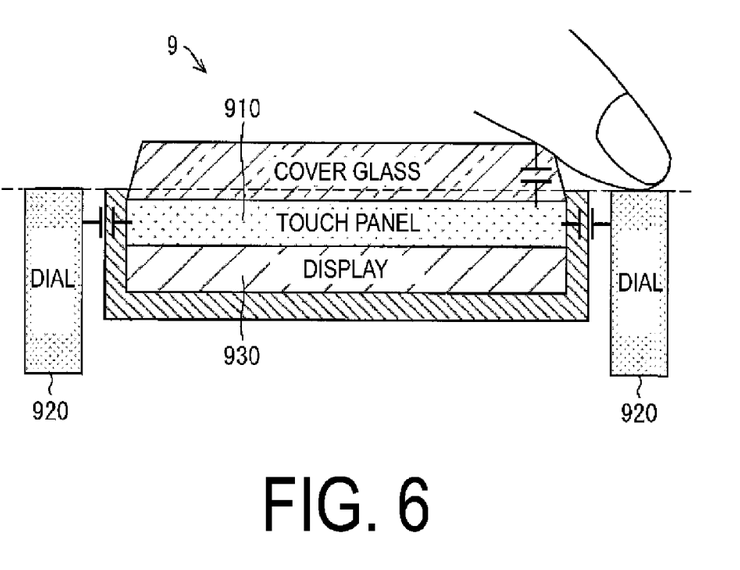
FIG. 6 is a diagram illustrating a configuration of a general touch device.

FIG. 6 is a diagram illustrating an example of a configuration of a general touch device 9. As illustrated in FIG. 6, the touch device 9 includes a touch panel 910, a dial 920, and a display 930. The touch panel 910 is an electrostatic-type touch panel. The touch panel 910 detects change in electrostatic capacitance in a case where a finger of a user gets closer to the touch panel 910. The touch panel 910 outputs a signal based on the detected change in electrostatic capacitance. The dial 920 surrounds the touch panel 910. The dial 920 is rotatable about an axis perpendicular to a surface of the touch panel 910.

CITATION LIST

Patent Literature

PTL 1: US 2014/0139637 A1 (published on May 22, 2014)

SUMMARY

Technical Problem

As illustrated in FIG. 6, electrostatic capacitance between the touch panel 910 and the dial 920 varies depending on a position of the dial 920. Consequently, the touch panel 910 outputs a signal (dial signal) that is based on such changes in electrostatic capacitance. A signal output by the touch panel 910 in a case where touch operation is performed includes a signal based on the touch operation and the dial signal.

Figure 7A:
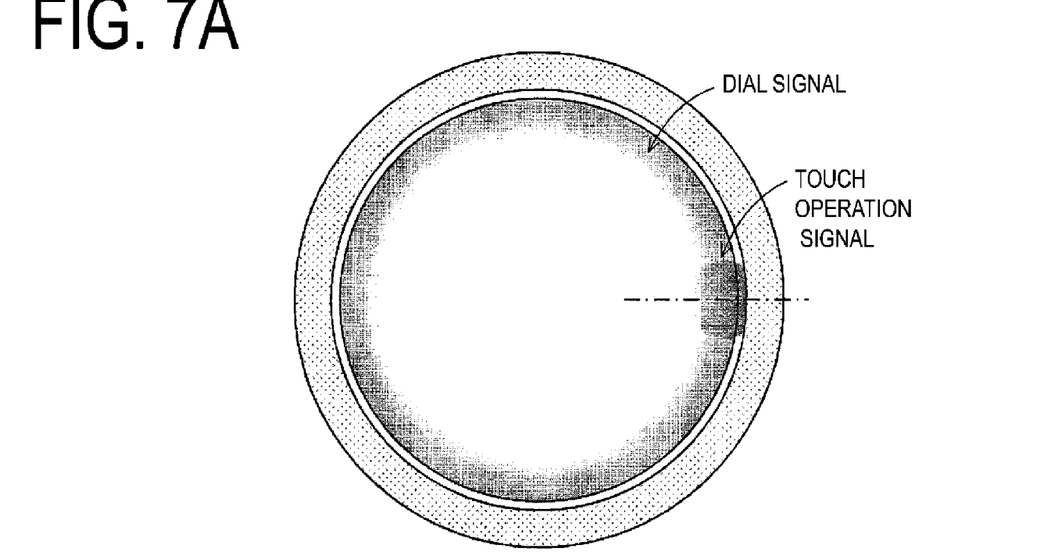
FIG. 7A is a diagram illustrating positions of signals generated by a touch panel of the touch device illustrated in FIG. 6.

FIG. 7A illustrates positions at which signals are generated in the touch panel 910 in a case where the touch operation illustrated in FIG. 6 is performed. In FIG. 7A, a touch operation signal is locally present in a partial area of a peripheral edge of the touch panel 910. In contrast, the dial signal is substantially uniformly distributed in the entire peripheral edge of the touch panel 910. The broken line in FIG. 7A passes through an area in which the touch operation signal and the dial signal overlap.

Figure 7B:
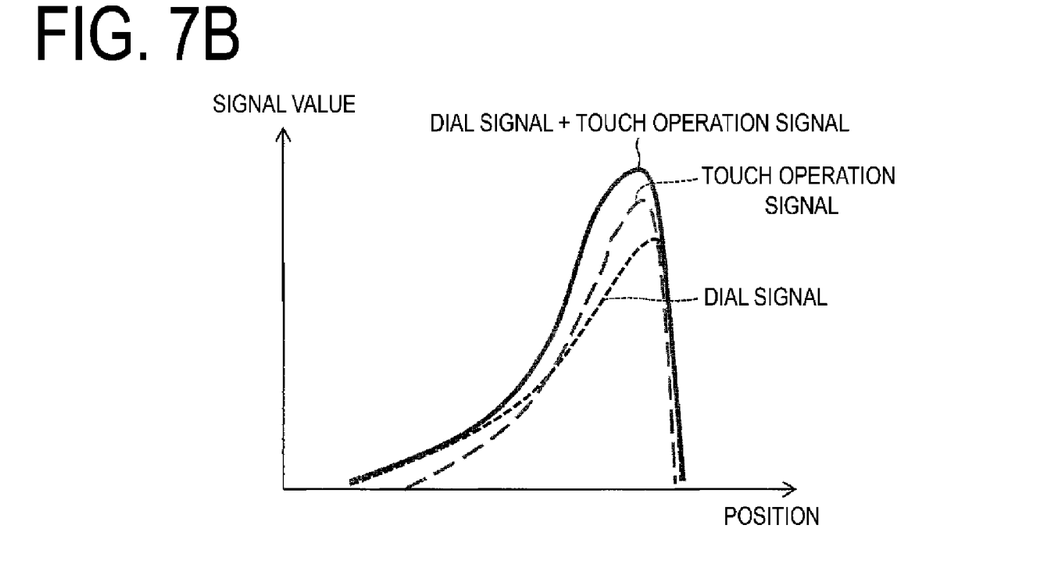
FIG. 7B is a graph illustrating signal values along the broken line in FIG. 7A.

FIG. 7B illustrates a signal positions along the broken line in FIG. 7A. The signal value corresponds to a change amount of electrostatic capacitance detected by the touch panel 910. A signal (graph of the solid line) output by the touch panel 910 includes the touch operation signal and the dial signal (both graphs of the broken lines). In the graph of the solid line in FIG. 7B, a peak position of the touch operation signal and a peak position of the dial signal overlap. Therefore, in a case where a peak of a signal is present at a peripheral edge of the touch panel 910, it is difficult to determine whether the peak is based on touch operation or not. Further, since the dial signal varies as the dial 920 is rotated, the dial signal cannot be considered as a fixed pattern. Thus, it is difficult to separate the dial signal and the touch operation signal from a signal generated by the touch panel 910.

One aspect of the disclosure has an object realize an electronic device capable of easily separating a signal based on touch operation, from a signal output by a touch panel.

Solution to Problem

To solve the problem described above, an electronic device according to one aspect of the disclosure has a configuration in which the electronic device includes a touch panel of an electrostatic type; a touch surface being touched by a user to perform touch operation; and a wall part surrounding a peripheral edge of the touch panel and the touch surface, wherein the wall part is a dial having an annular shape rotatable along a peripheral edge of the touch panel and the touch surface, and in a height direction of the wall part, the wall part is located at a position higher than a position of the touch surface.

Advantageous Effects of Disclosure

According to one aspect of the disclosure, a signal based on touch operation can e easily separated from a signal output by a touch panel.

DESCRIPTION OF EMBODIMENTS

First Embodiment

Embodiments of the disclosure will be described below in detail with reference to FIG. 1 to FIG. 5.

Configuration of Touch Device 1

Figure 1:
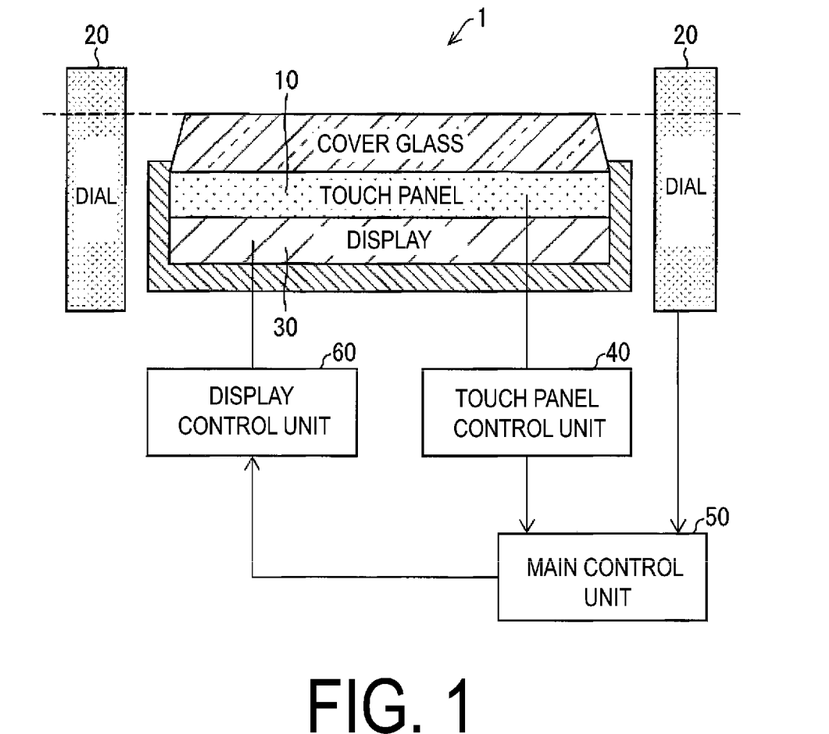
FIG. 1 is a schematic view illustrating a configuration of a touch device according to a first embodiment.
Figure 2A:
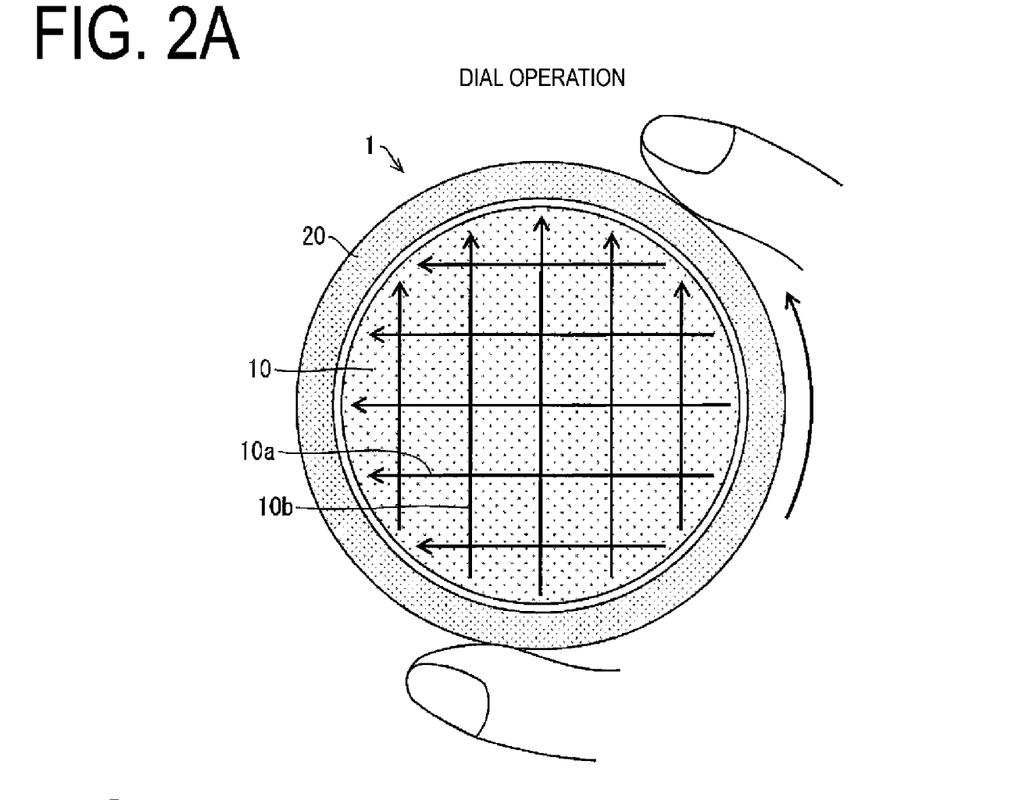
FIG. 2A is a diagram illustrating a state in which dial operation is performed on the touch device according to the first embodiment.
Figure 2B:
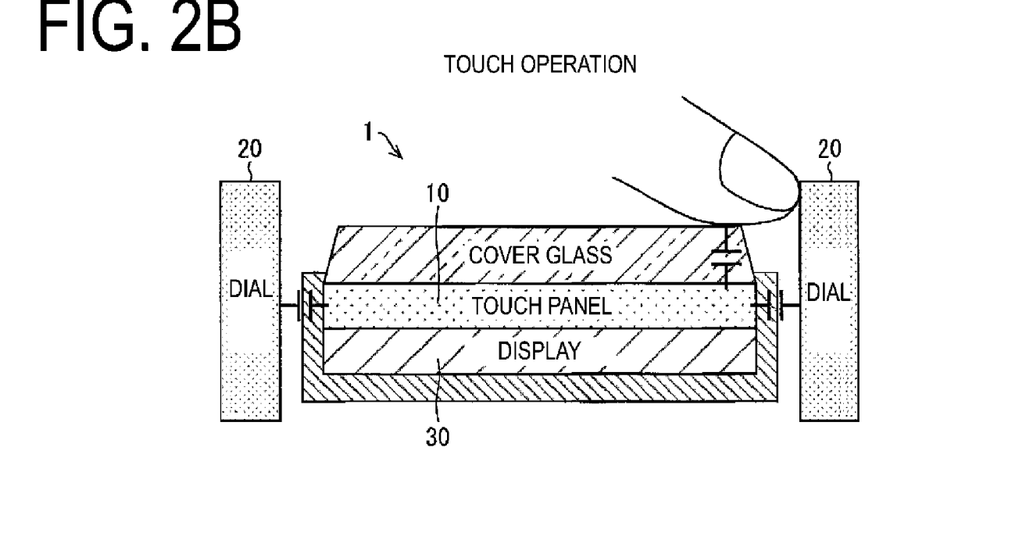
FIG. 2B is a diagram illustrating a state in which touch operation is performed.

With reference to FIG. 1 and FIGS. 2A and 2B, a touch device 1 (electronic device) according to a first embodiment will be described. FIG. 1 is a schematic view illustrating a configuration of the touch device 1 according to the first embodiment. FIG. 2A is a top view of the touch device 1, and is a diagram illustrating a state in which dial operation is performed on the touch device 1. As illustrated in FIG. 2A, dial operation refers to operation in which a dial part 20 is rotated along a peripheral edge of a touch panel 10. FIG. 2B is a schematic view illustrating a configuration of the touch device 1, and is a diagram illustrating a state in which touch operation is performed on the touch device 1. As illustrated in FIG. 2B, touch operation refers to operation performed while a finger or the like of a user touches or is close to the touch panel 10. In the present embodiment, a user performs touch operation while a user touches an upper surface (touch surface) of a cover glass disposed above the touch panel 10.

As illustrated in FIG. 1, the touch device 1 includes the touch panel 10, a dial part 20 (wall part), a display 30, a touch panel control unit 40 (touch position identifying unit), a main control unit 50, and a display control unit 60. On the touch panel 10, the cover glass with a touch surface is disposed. Alternatively, the touch surface may be formed by any transparent protective member (e.g., an acrylic cover or case) disposed above the touch panel 10.

The touch panel 10 is an electrostatic-type touch panel. The touch panel 10 includes a plurality of electrostatic sensors. These electrostatic sensors are distributed in the entire surface of the touch panel 10 having a circular shape, and detect a change amount of electrostatic capacitance, which is changed due to touch operation. The touch panel 10 outputs a signal indicating change in electrostatic capacitance detected by the electrostatic sensors to the touch panel control unit 40.

The horizontal and vertical arrows in FIG. 2A indicate sensor lines 10a and 10b of the touch panel 10, respectively. The electrostatic sensors of the touch panel 10 are formed at respective intersections of the sensor lines 10a and the sensor lines 10b.

As illustrated in FIG. 2B, during the time in which a user performs touch operation, the touch panel 10 outputs a first signal (touch operation signal) that is based on change in electrostatic capacitance between a finger of a user and the touch panel 10. In a case where a finger of a user performing touch operation touches the dial part 20, the touch panel 10 also outputs a second signal (dial signal) that is based on change in electrostatic capacitance between the touch panel 10 and the dial part 20. Thus, a signal output by the touch panel 10 includes the touch operation signal and the dial signal.

The dial part 20 is rotatable around an axis perpendicular to a surface of the touch panel 10. As illustrated in FIG. 2A, the dial part 20 has a ring-like shape, and surrounds the touch panel 10. Although illustration is omitted, the touch device 1 further includes a rotation amount detection unit that detects a rotation amount of the dial part 20. The dial part 20 and the rotation amount detection unit constitute a dial system. The dial system generates dial position information indicating a position (dial position) of the dial part 20 as measured with respect to a reference position, based on the rotation amount of the dial part 20 detected by the rotation amount detection unit. Then, the dial system transmits the generated dial position information to the main control unit 50.

The display 30 is a display device controlled by the display control unit 60. For example, the display 30 may be a liquid crystal display device or an Electro luminescent (EL) display device. The display 30 and the display control unit 60 are not essential components of the touch device 1. Specifically, the touch device 1 need not include the display 30 and the display control unit 60.

The touch panel control unit 40 acquires signals that are output in a case where the touch panel 10 detects change in electrostatic capacitance. Then, the touch panel control unit 40 identifies a position (touch position) at which touch operation is performed, based on the acquired signals. How the touch panel control unit 40 identifies a touch position will be described later. The touch panel control unit 40 transmits touch position information indicating the identified touch position to the main control unit 50.

The main control unit 50 controls each part of the touch device 1, based on the dial position information received from the dial system and the touch position information received from the touch panel control unit 40. For example, the main control unit 50 generates a command for changing a graphical interface to be displayed on the display 30, depending on a touch position and a dial position. In this case, the main control unit 50 transmits a generated command to the display control unit 60. The display control unit 60 controls display on the display 30 in accordance with the command from the main control unit 50.

Area in Which Touch Operation Can Be Performed and Signals

As illustrated in FIG. 1, in the touch device 1, the dial part 20 is located at a higher position than the upper surface, i.e., the touch surface, of the cover glass. Thus, a finger of a user performing touch operation while the finger touches the touch surface is located at a lower position than the position of the dial part 20. A finger of a user invariably touches the dial part 20 before the finger reaches a peripheral edge of the cover glass and the touch panel 10. Therefore, a user cannot perform touch operation at a peripheral edge of the cover glass and the touch panel 10. In other words, an area in which a user can perform touch operation is limited to an area inside of a peripheral edge of the cover glass and the touch panel 10 by the dial part 20. It is desirable that the height of the dial part 20 measured from the touch surface be 1 mm or more. It is most preferable that the touch panel 10 be capable of detecting touch operation on the entire touch surface. Such a configuration can be realized by disposing touch sensors in the entire touch panel 10. It is desirable that the touch panel 10 be configured to be capable of detecting touch operation at least in an area defined from the center of the touch surface to 5 mm inside of a peripheral edge of the touch surface. Note that an area in which a user can perform touch operation varies depending on the size of a hand, the length of a nail, and the like of a user.

With reference to FIG. 6, in a general touch device 9, the dial part 20 is located at a lower position than an upper surface of a cover glass. Thus, a finger of a user performing touch operation is located at a higher position than the position of a dial 920. Therefore, in the general touch device 9, an area in which a user can perform touch operation is not limited by the dial 920. Therefore, a user can touch a peripheral edge of the touch panel 910 to perform touch operation.

Figure 3A:
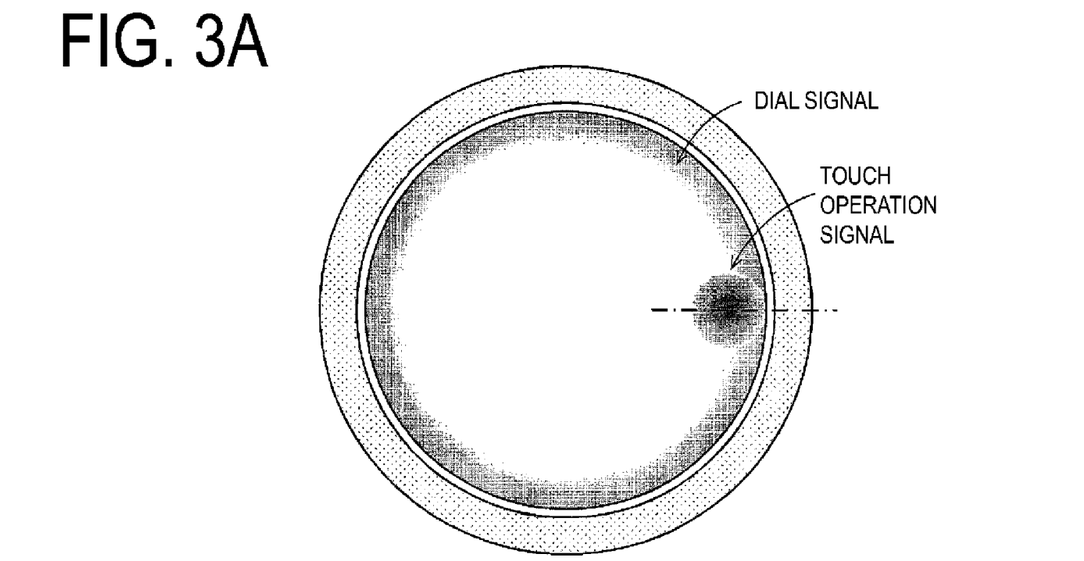
FIG. 3A is a diagram illustrating positions of signals generated by a touch panel of the touch device according to the first embodiment.
Figure 3B:
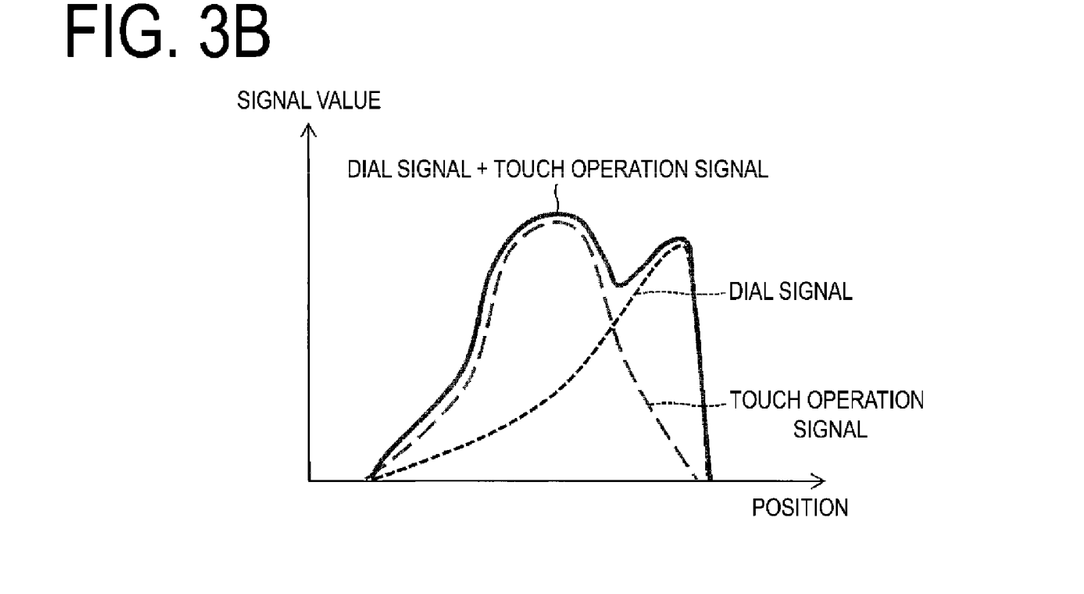
FIG. 3B is a graph illustrating signal values at positions along the broken line in FIG. 3A.

FIG. 3A illustrates positions at which signals are generated in the touch panel 10 in a case where the touch operation illustrated in FIG. 2B is performed. The broken line in FIG. 3A passes through an area in which the touch operation signal and the dial signal overlap. FIG. 3B is a graph illustrating signal values at positions along the broken line in FIG. 3A. As illustrated in FIG. 3B, a signal (solid line) output by the touch panel 10 includes the touch operation signal and the dial signal (both broken lines).

As described above, a user can perform touch operation only in an area inside of a peripheral edge of the touch panel 10 and the cover glass. Therefore, a peak position of the touch operation signal is invariably present inside of a peripheral edge of the touch panel 10. In contrast, a peak position of the dial signal is present at or near a peripheral edge of the touch panel 10. Therefore, as illustrated in the graph of FIG. 3B, the peak position of the touch operation signal and the peak position of the dial signal are clearly apart from each other. Thus, the touch panel control unit 40 can easily identify the peak of the touch operation signal, in a signal output from the touch panel 10. The peak position of the touch operation signal corresponds to a touch position. Thus, even in a case where a signal output from the touch panel 10 includes the dial signal, the touch panel control unit 40 can accurately identify a touch position, based on the touch operation signal output by the touch panel 10.

Operation of Touch Device 1

Figure 4:
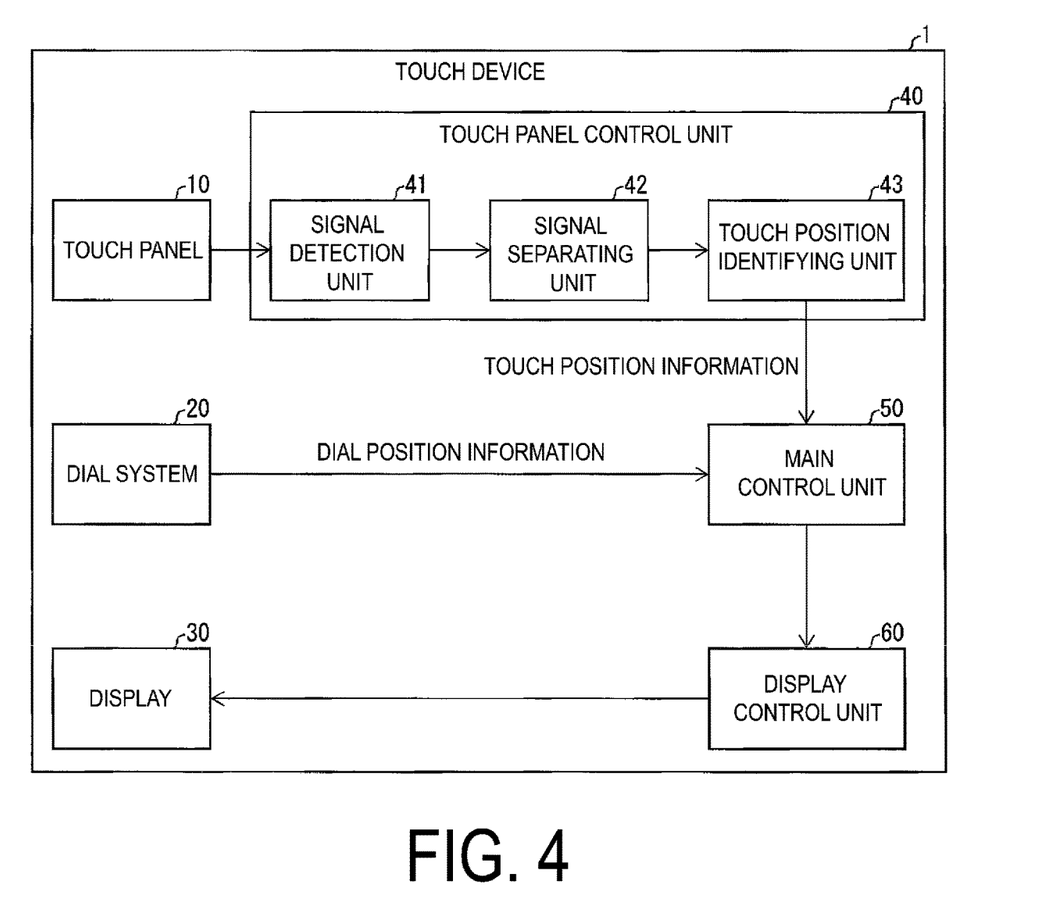
FIG. 4 is a block diagram illustrating the touch device according to the first embodiment.
Figure 5:
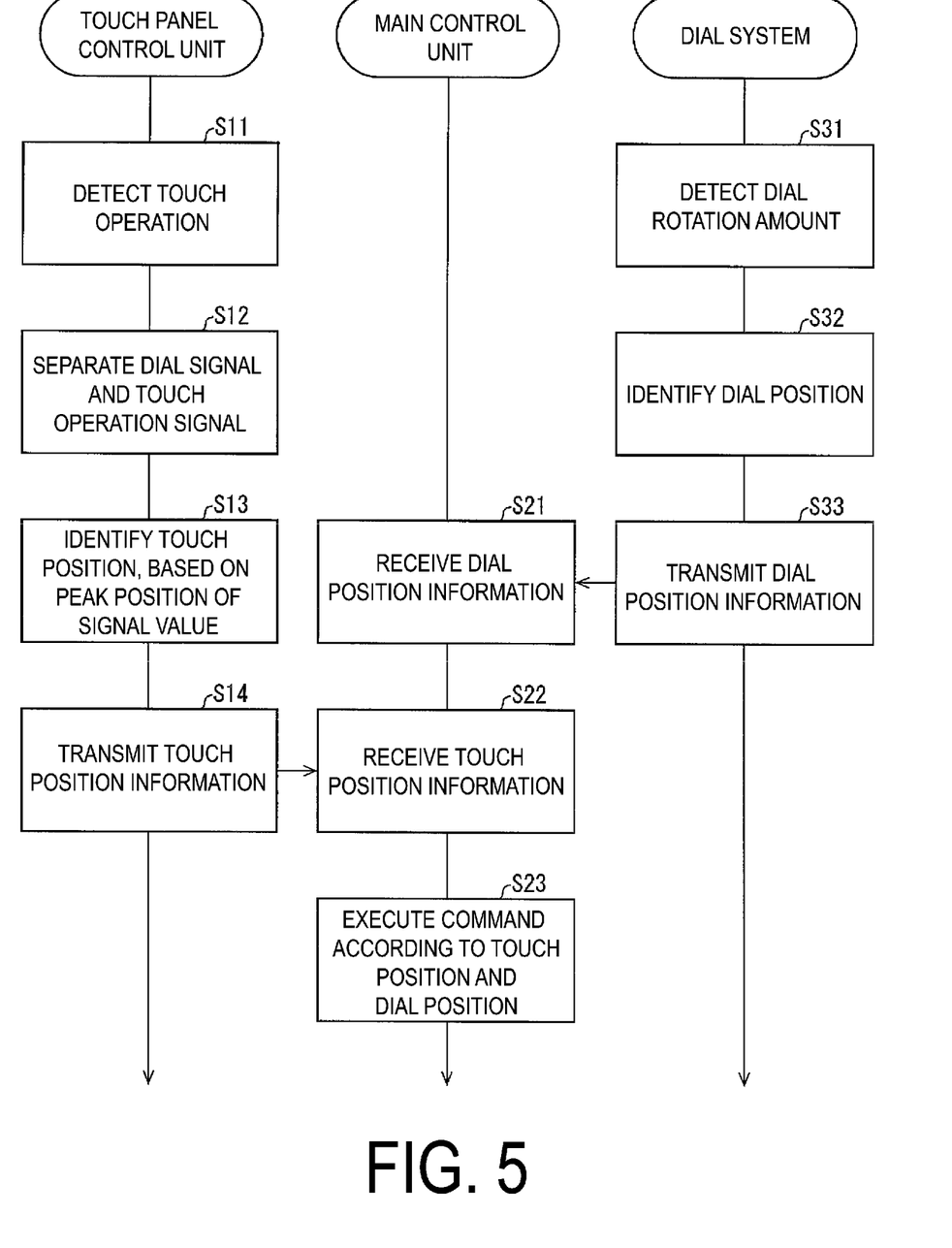
FIG. 5 is a sequence diagram illustrating a flow of operation of a dial system, a touch panel control unit, and a main control unit of the touch device according to the first embodiment.

With reference to FIG. 4 and FIG. 5, operation of the touch device 1 will be described. FIG. 4 is a block diagram of the touch device 1. FIG. 5 is a sequence diagram illustrating a flow of operation of each part, specifically the dial system, the touch panel control unit 40, and the main control unit 50, included in the touch device 1. As illustrated in FIG. 4, the touch panel control unit 40 includes a signal detection unit 41, a signal separating unit 42, and a touch position identifying unit 43.

As illustrated in FIG. 5, in the dial system, first, the rotation amount detection unit detects a rotation amount of the dial part 20 (S31). The dial system identifies a dial position, based on the rotation amount of the dial part 20 detected by the rotation amount detection unit and information of a preset reference position (S32). Then, the dial system transmits information of the identified dial position to the main control unit 50 (S33).

In the touch panel control unit 40, first, the signal detection unit 41 acquires, from the touch panel 10, a signal that is output from the touch panel 10 (S11). The signal detection unit 41 outputs the signal acquired from the touch panel 10 to the signal separating unit 42.

The signal separating unit 42 identifies a peak position of the touch operation signal, in the signal acquired from the signal detection unit 41 (S12). As described above, a peak position of the dial signal and a peak position of the touch operation signal are apart from each other (see FIG. 2B). Thus, the signal separating unit 42 can easily separate the peak of the dial signal and the peak of the touch operation signal. The signal separating unit 42 outputs information of the identified peak position of the touch operation signal the touch position identifying unit 43.

Next, the touch position identifying unit 43 determines that the peak position of the touch operation signal identified by the signal separating unit 42 is a touch position, i.e., a position at which touch operation is performed (S13). Then, the touch position identifying unit 43 transmits information of the identified touch position to the main control unit 50 (S14).

The main control unit 50 receives dial position information from the dial system (S21). Further, the main control unit 50 receives touch position information from the touch panel control unit 40 (S22). S21 and S22 may be performed in reverse order.

The main control unit 50 executes a command according to a touch position and a dial position, based on the received dial position information and touch position information (S23). For example, the main control unit 50 generates a command for causing the display control unit 60 to change a graphical interface. In this case, the main control unit 50 transmits the generated command to the display control unit 60. The display control unit 60 controls the display 30 in accordance with the command received from the main control unit 50.

Second Embodiment

Other embodiments of the disclosure may be described as follows. Note that, for the sake of convenience of description, a member having the same function as the function of the member described in the embodiment described above is denoted by the same reference sign, and description thereof is omitted.

In a second embodiment, the touch device 1 includes a non-rotatable wall part, instead of the dial part 20. The shape of the wall part is not specifically limited, as long as the wall part has an annular shape. However, since the wall part is disposed along a peripheral edge of the touch panel 10, the wall part has a size large enough to at least enclose the touch panel 10 inside the wall part. The wall part is located at a position higher than the touch surface, the upper surface of the cover glass, similarly to the dial part 20 of the first embodiment described above (see FIG. 1). It is desirable that the height of the wall part measured from the touch surface be 1 mm or more. For example, the wall part may form a frame of a screen displayed by the display 30. At least a portion of the wall part has conductivity.

According to the configuration of the present embodiment, in a case where a user performs touch operation while a user touches the touch surface, a range within which a finger of a user can move on the touch surface is limited by the wall part. Thus, a finger of a user can be prevented from touching a peripheral edge of the touch panel 10.

Third Embodiment

Example of Realization by Software

A control block (in particular, the touch panel control unit 40, the main control unit 50, and the display control unit 60) of the touch device 1 may be realized by a logic circuit (hardware) formed on an integrated circuit (IC chip) or the like, or may be realized by software by using a Central Processing Unit (CPU).

In the latter case, the touch device 1 includes a CPU that executes instructions of a program that is software to realize various functions, a Read Only Memory (ROM) or a storage device (these are referred to as a "storage medium") in which the above-described program and various data are stored so as to be readable by a computer (or the CPU), a Random Access Memory (RAM) in which the above-described program is deployed, and the like. Then, the computer the CPU) reads the program from the above-described recording medium and executers the program, and hence the object of the disclosure is achieved. As the above-described recording medium, a "non-transitory tangible medium", such as a tape, a disk, a card, semiconductor memory, and a programmable logic circuit, can be used. Further, the above-described program may be supplied to the above-described computer via any transmission medium (such as a communication network and broadcast waves) through which the program can be transmitted. Note that one aspect of the disclosure can also be realized in the format of data signals embedded in carrier waves, in which the program is realized by electronic transmission.

Supplement

The electronic device (touch device 1) according to a first aspect of the disclosure includes the touch panel (10) of an electrostatic type; a touch surface disposed on the touch panel, the touch surface being touched by a user to perform touch operation; and a wall part (dial part 20) surrounding a peripheral edge of the touch panel and the touch surface, wherein the wall part is a dial having an annular shape rotatable along a peripheral edge of the touch panel and the touch surface, and in a height direction of the wall part, the wall part is located at a position higher than a position of the touch surface.

According to the configuration described above, a range within which a finger of a user can move on the touch surface is limited by the wall part. Thus, touch operation can be performed only in an area inside of a peripheral edge of the touch panel and the touch surface. Therefore, a peak position of the first signal (touch operation signal) output based on touch operation by the touch panel is invariably present inside of a peripheral edge of the touch panel. In contrast, a peak position of the second signal (dial signal) output by the touch panel, based on change in electrostatic capacitance between the touch panel and the wall part is present at or near a peripheral edge of the touch panel. Thus, the first signal and the second signal can be easily separated. Further, a touch position on the touch panel can be easily identified based on the peak position of the first signal based on touch operation.

According to the configuration described above, the wall part is a rotatable dial. Therefore, a user can perform dial operation of rotating the dial. In a case where the dial makes one rotation, the second signal is the same as before the dial makes one rotation. In contrast, quality of a signal based on a noise factor (mainly, electrostatic capacitance between atmosphere and the touch panel) other than the dial is equalized while the dial makes one rotation. Thus, acquiring information of change in a signal generated by the touch panel while the dial makes one rotation at a freely selected point on the touch panel enables separation of the second signal and the signal based on a noise factor other than the dial. Further, removing the second signal and the above signal based on a noise factor from a signal generated by the touch panel allows the first signal based on touch operation to be acquired.

In an electronic device according to a second aspect of the disclosure, in the first aspect, the touch panel and the touch surface may have a circular shape. According to the configuration described above, a user can perform touch operation on the touch panel having a circular shape.

An electronic device according to a third aspect of the disclosure may further include, in the first or second aspect, the display (30) disposed on a lower side of the touch panel. According to the configuration described above, a graphical interface for touch operation can be provided to a user, through display on the display.

In an electronic device according to a fourth aspect of the disclosure, in any one of the first to third aspects, at least a portion of the wall part may have conductivity. According to the configuration described above, the touch panel can detect change in electrostatic capacitance between the touch panel and the wall part.

An electronic device according to a fifth aspect of the present invention may further include, in any of the first to fourth aspects, a signal separating unit configured to separate a first signal and a second signal from a signal output by the touch panel in a case where a user touches the touch surface to perform the touch operation, the first signal being based on the touch operation, the second signal being based on electrostatic capacitance between the touch panel and the wall part.

According to the configuration described above, the first signal, which is necessary to identify a touch position, can be separated from a signal output by the touch panel. In other words, the second signal, which is not based on touch operation, can be removed from a signal output by the touch panel.

An electronic device according to a sixth aspect of the disclosure may further include, in the fifth aspect, a touch position identifying unit (43) configured to determine that a peak position of the first signal is a position of the touch operation, the first signal being included in a signal output by the touch panel in a case where a user touches the touch surface to perform the touch operation.

As described above, the peak position of the first signal and the peak position of the second signal are apart from each other. In other words, a signal output by the touch panel has two or more peaks. Further, on the touch panel, the peak of the first signal is present inside of the peak of the second signal. Thus, the peak of the first signal can be easily identified (extracted) from the two or more peaks included in a signal output by the touch panel. According to the configuration described above, it can be determined that the peak position of the first signal identified in this manner is the position of touch operation.

In an electronic device according to a seventh aspect of the disclosure, in any one of the first sixth aspects, a height of the wall part measured from the touch surface may be 1 mm or more.

According to the configuration described above, a finger of a user performing touch operation while the finger touches the touch surface hardly passes across the wall part. Therefore, a finger of a user can be prevented from touching a peripheral edge of the touch panel and the touch surface.

The electronic device according to each aspect of the disclosure may be realized by a computer. In this case, a control program of the electronic device and a computer-readable recording medium recording the control program, which realizes the electronic device in a computer by causing the computer to operate as a software element (for example, the touch panel control unit) included in the electronic device, also falls within the scope of the disclosure.

REFERENCE SIGNS LIST

1 Touch device (electronic device
10 Touch panel
20 Dial part (wall part)
30 Display
42 Signal separating unit
43 Touch position identifying unit

The invention claimed is:
1. An electronic device comprising:
A touch panel of an electrostatic type;
a touch surface disposed on the touch panel, the touch surface being touched by a user to perform touch operation; and
a wall part surrounding a peripheral edge of the touch panel and the touch surface,
wherein the wall part is a dial having an annular shape rotatable along a peripheral edge of the touch panel and the touch surface, and
in a height direction of the wall part, the wall part is located at a position higher than a position of the touch surface, and
a signal separating unit configured to separate a first signal and a second signal from a signal output by the touch panel in a case where the user touches the touch surface to perform the touch operation, the first signal being based on the touch operation, the second signal being based on electrostatic capacitance between the touch panel and the wall part.

2. The electronic device according to claim 1, wherein the touch panel and the touch surface have a circular shape.

3. The electronic device according to claim 1, further comprising a display disposed on a lower side of the touch panel.

4. The electronic device according to claim 1, wherein at least a portion of the wall part has conductivity.

5. The electronic device according to claim 1, further comprising a touch position identifying unit configured to determine that a peak position of the first signal is a position of the touch operation, the first signal being included in a signal output by the touch panel in a case where the user touches the touch surface to perform the touch operation.

6. The electronic device according to claim 1, wherein a height of the wall part measured upward from the touch surface is 1 mm or more.

* * * * *